United States Patent Office 2,966,680
Patented Dec. 27, 1960

2,966,680

BLUE INKS FOR BALL POINT FOUNTAIN PENS

Norman L. Anderson, Hamburg, N.Y., assignor to Allied Chemical Corporation, a corporation of New York No Drawing. Filed Nov. 25, 1957, Ser. No. 698,332

10 Claims. (Cl. 106—23)

This invention relates to inks for ball point fountain pens. The inks are characterized by high color strength and brilliance, high color concentration, and a range of shades, e.g. purple, violet, and royal blue, which have long enjoyed established consumer preference in inks for conventional fountain pens.

The inks of the present invention contain high concentrations (preferably 40% to 50% by weight) of dissolved color. Their color strength exceeds that of conventional fountain pen inks by a factor of 20 fold or more. For example one cubic centimeter of an ink of the present invention will provide a written line of 10,000 to 15,000 feet equivalent to about 50,000 to 70,000 words, whereas an equal volume of conventional ink will provide a line of only 500 to 750 feet, equivalent to about 2,500 to 4,000 words. Ball point pens supplied with the inks of the present invention may be used, at average rates, for long periods before purchase of a refill cartridge containing a new ink supply is required. This advantage is important in enabling ball point fountain pens to compete successfully with conventional fountain pens.

Inks for ball point fountain pens must meet many exacting specifications if satisfactory trouble-free service is to be obtained because of certain mechanical structural features of the pen. The pen comprises a hollow tube open at the upper end and tapered at the lower end to a socket in which a hard (stainless steel, tungsten carbide or sapphire) ball, having a diameter of about 1 millimeter, rotates. Clearance between the ball and socket varies from 1 to 5 microns depending on the style of pen and viscosity of ink used. The hollow tube serves as the ink reservoir which feeds the ink by gravity into the socket and against the upper surface of the ball. When the pen is used, the ball rotates and transfers ink onto the receiving surface.

Although it is highly desirable that ball point fountain pen inks shall have a high concentration of color value, it is likewise important that the color should not crystallize out; this is particularly likely to happen if solvent evaporates from ink at the open tip of the ball point, which results in a "freezing" of the ball to the socket. Accordingly the solvent used in the ink should have a low vapor pressure to avoid this evaporation. Likewise for water-fast colors the solvent should not be so hygroscopic that sufficient water will be absorbed from the atmosphere into ink exposed at the ball point to cause precipitation of color. For similar reasons the ink must be free of dust, grit, and insoluble matter and must be non-corrosive to the ball, socket or channel parts of the pen.

A ball point pen ink should be sufficiently viscous so that the ink will neither seep past the ball nor leak from the open upper end of the reservoir tube when the pen is inverted. Yet it must also be sufficiently fluid so that a film of ink is drawn between the ball and socket and onto the writing surface without producing an excessive drag on the ball as it rotates. Such drag causes the ink line to be thin with a resultant loss of color intensity, definition and legibility. The viscosity should also change very little within the range of temperatures at which use of the pen may be required, i.e. circa 0° to 100° F.

It has heretofore been known that diaryl guanidine salts of acid forms of sulfonic acid dyes are, as a rule, soluble in ethanol and the like and hence useful for dyeing pyroxylin lacquers, spirit varnishes and the like. However, tests of hundreds of such colorants have shown that less than 0.5% of those tested had the color strength, light fastness, water fastness and especially, the solubility in the ink solvents of the present invention required to make a ball point fountain pen ink of acceptable quality. No relationship is known which would enable one to predict whether or not a colorant is suitable for the inks of the present invention, particularly as to solubility characteristics, upon the basis of the molecular structure of the colorant.

Blue ball point fountain pen inks of the prior art have been colored with certain copper phthalocyanine derivatives, specifically certain diaryl guanidine salts of copper phthalocyanine disulfonic acids. Such inks have proven to be outstanding in light fastness and water fastness but are somewhat weak in color strength and are of an unpopular greenish shade of blue.

The novel colorants characterizing the inks of the present invention provide purple, violet, and royal blue colors of great strength and brilliance. They compare favorably with ordinary conventional fountain pen inks as to water fastness and light fastness.

Inks containing the novel colorants and copper phthalocyanine colorants may be obtained in desired shades which combine color strength and brilliance with the light fastness and water fastness needed to obtain a permanent ink superior to ordinary fountain pen inks.

The colorants of the present invention are water-insoluble salts of diaryl guanidines having the following formula:

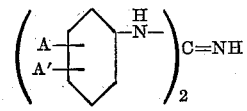

wherein the ring is a benzene ring, A and A' represent members of the group consisting of H, $CH_3$, $C_2H_5$, $C_3H_7$ and i—$C_3H_7$, located in any of positions 2 to 6 in the rings, with the free sulfonic acids corresponding to the triphenyl methane dyes Wool Violet 4BN (New Colour Index Acid Violet 49) and Brilliant Wool Blue FFR (New Colour Index Acid Blue 104).

These colorants combine good color strength, fairly good light fastness and fairly good water fastness with extreme solubility in the solvent media, hereinafter defined, which characterize the inks of the present invention.

The colorants are ordinarily prepared by heating a mixture of an aqueous solution of the diaryl guanidine component and an aqueous solution of the dye component. The resulting diaryl guanidine salt of the acid form of the dye (which salt must be insoluble in water if the color is to be waterfast) precipitates out and is then isolated, dried, and ground.

The solvent characterizing the inks of the present invention consists—to the extent of at least 90% by weight—of a compound or a mixture of such compounds having the general formula:

wherein
R' is selected from the group consisting of H and $C_1$–$C_8$ alkyl groups,
R is an alkylene group containing from 2 to 10 carbon atoms, inclusive, $n$ is an integer from 1 to 5, inclusive, and the total number of carbon atoms is from 2 to 10, inclusive.

Preferred solvents of this class are diols, i.e. compounds of the above general formula wherein R' is hydrogen.

Representative solvents of this class include ethylene glycol, propylene glycol, 1,3-butanediol, hexylene glycol, octylene glycol, monomethylether of ethylene glycol ("Methyl Cellosolve"), diethylene glycol, triethylene glycol, dipropylene glycol, and monoethyl ether of diethylene glycol ("Carbitol").

The inks of this invention should contain at least 25% of dissolved color to assure adequate color strength; (this dissolved color may include, however, colorants other than those characterizing the present invention). Preferably the color concentration should be from 40% to 50%. Color concentrations as high as 55% to 60% are obtainable with some formulations. This is surprising because the solvents are relatively hydrophilic in character whereas the colors are very insoluble in water. The ink viscosity may vary according to the style of the pen, particularly with reference to the clearance between the ball and socket at the ball point. In general the desired viscosity will range between 8,000 and 15,000 cps. at 25° C. Usually the desired viscosity is obtained simply by adjusting the color content of the formulation because, at the high color concentrations involved, small changes in color concentration produce relatively large changes in viscosity. Viscosity may also be adjusted by incorporating a suitable resin into the ink although usually this is neither necessary nor desirable.

If it is desired to modify the color of the ink, a few percent of a shading component may be included. The following colors have been found to be suitable as shading components: Auramine O (New Colour Index Basic Yellow 2); Victoria Green WB (New Colour Index Basic Green 4); Eosine OJ (New Colour Index Acid Red 87); Ethyl Eosine (Old Colour Index No. 770); Iosol Red (New Colour Index Solvent Red 68); and Methyl Violet 2B Base (New Colour Index Basic Violet 1).

It is often desirable to incorporate about 1% to 5% by weight of oleic acid or the like into the ink to lubricate the ball and socket.

Despite the fact that the solvent medium has a very low vapor pressure, the "drying" time of the inks of the invention is satisfactory because the solvent is usually absorbed by the paper and because the ink film laid down by the pen is very thin and contains a relatively low solvent/color ratio when compared to other inks.

The inks are made by dissolving the color in the solvent, suitably by use of a high speed agitator, and then centrifuging the resulting solution to remove the last traces of the insoluble matter.

The following representative examples describe colorants and inks within the scope of the present invention.

EXAMPLE 1

A. *Preparation of colorant.*—The colorant used in this example is a reaction product of di(mixed xylyl)guanidine with a mixture of two triphenylmethane dyes containing 16⅔% of Wool Violet 4BN (New Colour Index Acid Violet 49) and 83⅓% of Brilliant Wool Blue FFR (New Colour Index Acid Blue 104). The di(mixed xylyl)guanidine was prepared by nitrating a commercial coal tar xylene containing about 62% m-xylene, 27% p-xylene, 18% o-xylene and 3% ethyl benzene, reducing the resulting mixture of nitroxylenes to obtain a mixture of xylidines, condensing this mixture with carbon disulfide, and treating the reaction product with ammonia and litharage.

301 parts (0.382 mol) of Brilliant Wool Blue FFR (100% color basis) and 52 parts (0.071 mol) of Wool Violet 4BN (100% color basis) were dissolved in 3450 parts of water at 60° C., 3 parts of "Solka Floc" adsorbent were added and the solution (containing a total of 0.453 mol of dyestuffs) was sludge filtered to remove any insoluble material which might be present. A separate solution was made up to contain 210 parts (0.786 mol) of di(mixed xylyl)guanidine, 1330 parts of water, and 69.6 parts of 20° Bé. aqueous hydrochloric acid solution. The di(mixed xylyl)guanidine solution was then added to the filtered color solution at 35° C. during a period of 90 minutes. The mol ratio of guanidine:dyestuff was 1.7. The product precipitated out as coarse crystals which were isolated by filtration. The filter cake was washed with 1200 parts of cold water and dried, yielding Colorant A.

B. *Solubility of colorant in solvent suitable for ink formulation.*—Colorant A was found to dissolve readily at room temperature in the following solvents to give solutions containing at least 35% by weight of color: diethylene glycol; triethylene glycol; propylene glycol; 1,3-butanediol; hexylene glycol; octylene glycol; monoethylether of diethylene glycol ("Carbitol").

C. *Preparation of ink.*—An ink was prepared by agitating the following mixture in a high speed agitator at 70° to 80° C. until the color was completely dissolved in the solvent.

| Components: | Parts by weight |
|---|---|
| Propylene glycol | 58 |
| Oleic acid | 2 |
| Colorant A | 40 |

The resulting solution was centrifuged to remove traces of insoluble matter. The resulting ink had a viscosity of 8200 cps. at 25° C. It wrote freely and evenly in ball point fountain pens giving a well-defined bluish purple of good brightness and color intensity which "dried" quickly and showed good resistance to smearing, feathering, offset and bleeding. It showed satisfactory writing characteristics over the temperature range 0°–100° F.

The color concentration of the ink was tested in a "mechanical scriber" which maintained a pen point and paper roll in relative motion so that a compressed zig zag line was continuously formed on the paper. The color concentration was found to be equivalent to a line over 15,000 feet in length per cubic centimeter of ink consumed.

The light fastness of a sample of writing made with the ink was tested by exposure to intense ultraviolet irradiation in the "Fade-O-Meter." The writing remained legible after 20 hours of exposure. The water fasteness of another sample of writing was tested by soaking in water at room temperature. The writing remained legible after soaking for 20 hours.

Microscopic examination of the ink after storage for 7 weeks showed that crystal formation was negligible.

EXAMPLE 2

This example describes the preparation of inks similar to that described in Example 1 except that the only colorant present was the di(ortho-ethyl phenyl) guanidine salt of Brilliant Wool Blue FFR (New Colour Index Acid Blue 104).

217 parts (100% basis) of Brilliant Wool Blue FFR (0.276 mol) were dissolved in 1000 parts of water. 20 parts of "Nullapon" (tetra sodium salt of ethylene diamine tetracetic acid) were added to sequester and heavy metal ions present. The pH of the solution was adjusted to 8.0 by addition of dilute aqueous caustic soda solution. A separate solution was made up to contain 300 parts (1.12 mol) of di(ortho-ethyl phenyl) guanidine (obtained by condensing o-ethyl aniline with carbon bisulfide and treating the reaction product with ammonia and litharge) and 139 parts of 20° Bé. aqueous hydrochloric acid solution in 3000 parts of water. The di(ortho-ethyl phenyl) guanidine solution was then added to the solution of color at circa 25° C. during a period of one hour. The mol ratio of guanidine:dyestuff was 4.1. The batch was agitated for one hour and filtered. The filter cake was washed with 5000 parts of water and dried. Alcohol-insoluble matter in the product was then removed by dissolving the filter cake in 5 parts by weight thereon of ethanol, filtering the solution, adding the filtrate to 50 parts of water, filtering teh precipitate of purified color, and drying the filter cake. Blue inks were prepared by dissolving 22 parts by weight of the color at 80° C. in 29 parts of (1) propylene glycol and (2) a mixture of equal parts of octylene glycol and 1,3-butanediol. Microscopic examination of the cooled solutions showed that the amounts of undissolved matter were negligible. The inks were very similar in properties to the ink described in Example 1 except that the color, an intense royal blue, was less red in shade.

EXAMPLE 3

This example describes the preparation of an ink similar to that described in Example 1 except that the only colorant present was the di(ortho-ethyl phenyl) guanidine solt of Wool Violet 4BN (New Colour Index Acid Violet 49).

270 parts (100% basis) of Wool Violet 4BN (0.371 mol) were dissolved in 8000 parts of water at 80° C. The pH of the solution was adjusted to 8.5 by addition of dilute aqueous caustic soda solution. The solution was cooled to 40–45° C. and filtered to remove insoluble matter. A separate solution was made up to contain 180 (0.67 mol) parts of di(ortho-ethyl phenyl) guanidine and 82 parts of 20° Bé. aqueous hydrochloric acid solution in 1800 parts of water. The di(ortho-ethyl phenyl) guanidine solution was added to the solution of color at 40–45° C. during a period of one hour. The mol ratio of guanidine:dyestuff was 1.8. The batch was agitated for one hour and filtered. The filter cake was washed with 4000 parts of water and dried.

Blue inks were prepared as described in Example 2. They were similar in properties to the ink described in Example 1 except that the color, an intense purple, was a redder shade of blue.

EXAMPLE 4

An ink was made as described in Example 1, above, of the following formulation:

| Component: | Parts by weight |
| --- | --- |
| Octylene glycol | 25 |
| 1,3-butanediol | 25 |
| Oleic acid | 5 |
| Di(o-tolyl)guanidine salt of copper phthalocyanine disulfonic acid (essentially the product of U.S.P. 2,153,740, Example 1) | 20 |
| Colorant A | 25 |

The product was a high quality permanent ink of a bright royal blue shade. Its properties were similar to those set forth for the ink of Example 1 except that its fastness to light and water were greatly improved. Samples of writing remained well defined and legible after 100 hours of exposure to intense ultraviolet irradiation in the "Fade-O-Meter" and after 48 hours of soaking in water at room temperature (the tests were run on separate samples).

EXAMPLE 5

An ink was made as described in Example 1 of the following formulation:

| Component: | Parts by weight |
| --- | --- |
| Propylene glycol | 58 |
| Oleic acid | 2 |
| Methyl Violet 2B base | 8 |
| Di(o-tolyl)guanidine salt of copper phthalocyanine disulfonic acid (as in Example 4) | 12 |
| Colorant A | 20 |

The product was a high quality permanent ink of a bright deep violet shade with properties similar to those set forth for the ink of Example 4.

I claim:
1. An ink suitable for ball point pens comprising essentially 99 to 95 parts of a solution of 40–50% of colorant of which at least a major proportion is at least one water-insoluble salt of a diaryl guanidine having the formula

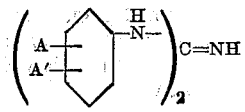

wherein the ring is a benzene ring,

A and A′ represent members of the group consisting of the group consisting of H, CH$_3$, C$_2$H$_5$, C$_3$H$_7$ and i-C$_3$H$_7$, located in any of positions 2 to 6 in the rings, with the acid form of a dyestuff selected from the group consisting of Colour Index Acid Violet 49 and Colour Index Acid Blue 104, said salt having been obtained by reacting an aqueous solution containing 1 mol of said dyestuff with an aqueous solution containing 1.7 to 4.1 mols of said guanidine, and said salt exhibiting an intense blue to purple color and being highly soluble in propylene glycol, in a solvent of the formula R′O(RO)$_n$H, wherein R′ is selected from the group consisting of H and C$_1$–C$_8$ alkyl groups, R is an alkylene group containing from 2 to 10 carbon atoms, inclusive, n is an integer from 1 to 5, inclusive, and the total number of carbon atoms is from 2 to 10, inclusive.

2. An ink suitable for ball point pens comprising essentially 99 to 95 parts of a solution of 40–50% of colorant of which at least a major proportion is at least one water-insoluble dixylyl guanidine salt of the acid form of Colour Index Acid Violet 49, said salt having been obtained by reacting an aqueous solution containing 1 mol of said dyestuff with an aqueous solution containing 1.8 mols of said guanidine, and said salt exhibiting an intense purple color and being highly soluble in propylene glycol, in a solvent of the formula R′O(RO)$_n$H, wherein R′ is selected from the group consisting of H and C$_1$–C$_8$ alkyl groups, R is an alkylene group containing from 2 to 10 carbon atoms, inclusive, n is an integer from 1 to 5, inclusive, and the total number of carbon atoms is from 2 to 10, inclusive.

3. An ink suitable for ball point pens comprising essentially 99 to 95 parts of a solution of 40–50% of colorant of which at least a major proportion is at least one water-insoluble dixylyl guanidine salt of the acid form of Colour Index Acid Blue 104, said salt having been obtained by reacting an aqueous solution containing 1 mol of said dyestuff with an aqueous solution containing 4.1 mols of said guanidine, and said salt exhibiting an intense royal blue color and being highly soluble in propylene glycol, in a solvent of the formula R′O(RO)$_n$H, wherein R′ is selected from the group consisting of H and C$_1$–C$_8$ alkyl groups, R is an alkylene group containing from 2 to 10 carbon atoms, inclusive, n is an integer from 1 to 5, inclusive, and the total number of carbon atoms is from 2 to 10, inclusive.

4. An ink suitable for ball point pens consisting essentially of a solution of at least 25% of colorant including a substantial proportion of at least one salt as defined in claim 1 in a solvent of the formula R′O(RO)$_n$H, wherein R′ is selected from the group consisting of H and C$_1$–C$_8$ alkyl groups, R is an alkylene group containing from 2 to 10 carbon atoms, inclusive, $n$ is an integer from 1 to 5, inclusive, and the total number of carbon atoms is from 2 to 10, inclusive, said ink having a viscosity between 8,000 and 15,000 cps. at 25° C.

5. An ink suitable for ball point pens consisting essentially of a solution of at least 25% of colorant including a substantial proportion of the salt defined in claim 2 in a solvent of the formula $R'O(RO)_nH$, wherein $R'$ is selected from the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive, said ink having a viscosity between 8,000 and 15,000 cps. at 25° C.

6. An ink suitable for ball point pens consisting essentially of a solution of at least 25% of colorant including a substantial proportion of the salt defined in claim 3 in a solvent of the formula $R'O(RO)_nH$, wherein $R'$ is selected from the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive, said ink having a viscosity between 8,000 and 15,000 cps. at 25° C.

7. An ink suitable for ball point pens consisting essentially of 99 to 95 parts of a solution of 40–50% of colorant including a major proportion of at least one salt as defined in claim 1 and a minor proportion of a glycol-soluble copper phthalocyanine colorant in a solvent of the formula $R'O(RO)_nH$, wherein $R'$ is selected from the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive.

8. An ink suitable for ball point pens consisting essentially of 99 to 95 parts of a solution of 40–50% of colorant including a major proportion of the salt defined in claim 2 and a minor proportion of a glycol-soluble copper phthalocyanine colorant in a solvent of the formula $R'O(RO)_nH$, wherein $R'$ is selected from the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive.

9. An ink suitable for ball point pens consisting essentially of 99 to 95 parts of a solution of 40–50% of colorant including a major proportion of the salt defined in claim 3 and a minor proportion of a glycol-soluble copper phthalocyanine colorant in a solvent of the formula $R'O(RO)_nH$, wherein $R'$ is selected from the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive.

10. An ink suitable for ball point pens consisting essentially of 99 to 95 parts of a solution of 40–50% of colorant including a major proportion of a mixture of a salt as defined in claim 5 and a salt as defined in claim 6 and a minor proportion of a glycol-soluble copper phthalocyanine colorant in a glycol of the formula

HOROH wherein R is a $C_2$–$C_{10}$ alkylene group, and as a lubricant, one to five parts of oleic acid.

References Cited in the file of this patent

UNITED STATES PATENTS

| | | |
|---|---|---|
| 1,674,128 | Rose | June 19, 1928 |
| 2,165,034 | Daudt et al. | July 4, 1939 |
| 2,022,678 | Kritchevsky | Dec. 3, 1935 |
| 2,623,827 | Moos | Dec. 30, 1952 |

OTHER REFERENCES

Gould et al.: "Inks for Ball Point Pens," American Ink Maker, July 1951 (pages 36–40 and 67).

Lubs: The Chemistry of Synthetic Dyes & Pigments," published 1955, by Reinhold, N.Y.C. (pages 177–8).

Colour Index: 2nd edition (1956), vol. 2 (pages 2840, 2853–4, 2882–3, 2896, 2904).

UNITED STATES PATENT OFFICE
CERTIFICATION OF CORRECTION

Patent No. 2,966,680                      December 27, 1960

Norman L. Anderson

It is hereby certified that error appears in the above numbered patent requiring correction and that the said Letters Patent should read as corrected below.

Column 3, line 70, for "litharage" read --- litharge ---; column 4, line 62, Example 2, for "and" read --- any ---.

Signed and sealed this 23rd day of May 1961.

(SEAL)
Attest:

ERNEST W. SWIDER                        DAVID L. LADD
Attesting Officer                             Commissioner of Patents